May 25, 1926.
O. L. WALLER
1,585,951
PIPE COUPLING
Filed Dec. 30, 1924
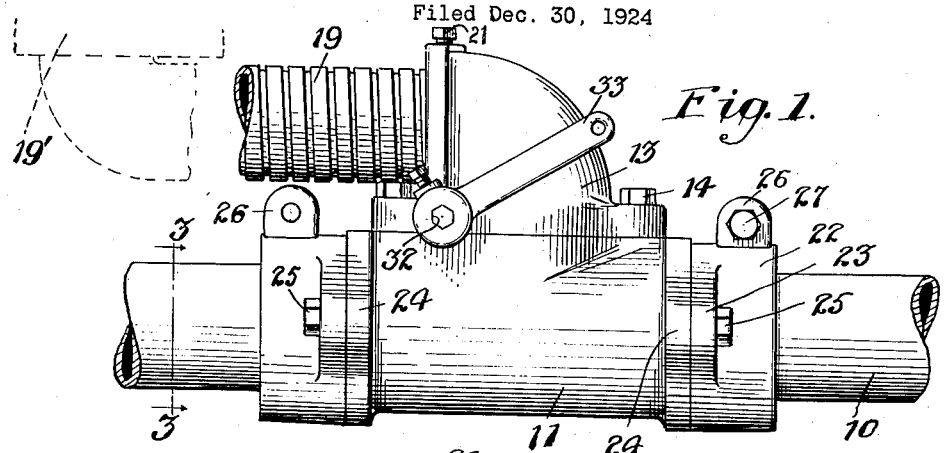
Fig. 1.
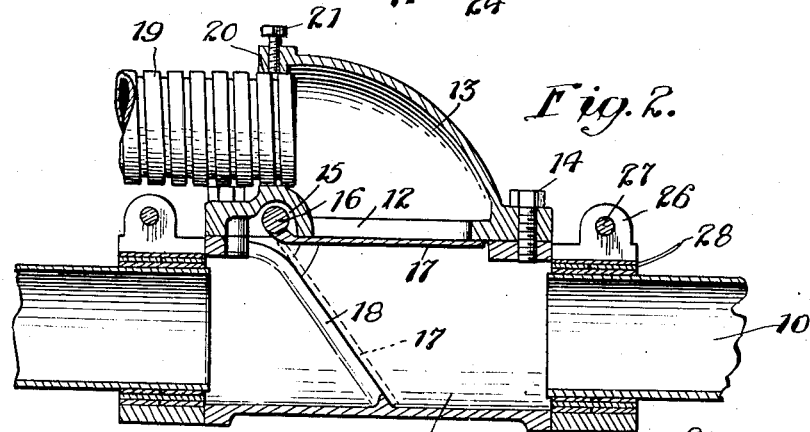
Fig. 2.
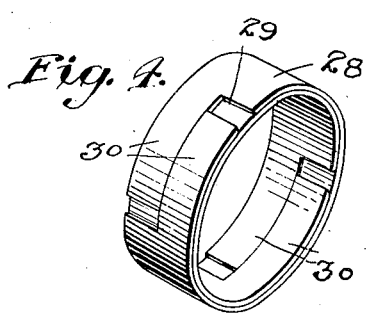
Fig. 4.
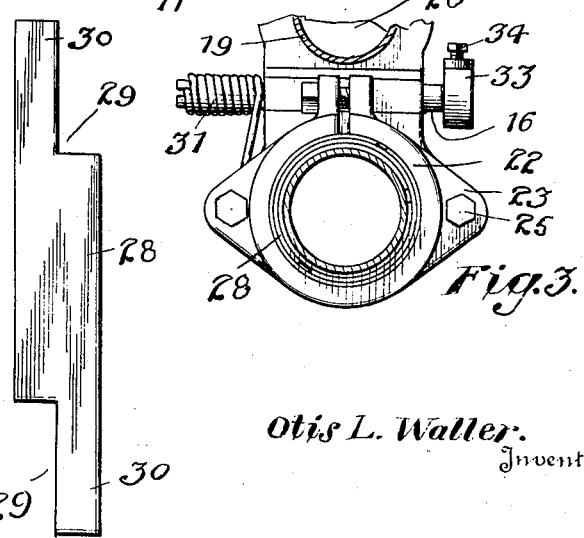
Fig. 3.
Fig. 5.
Otis L. Waller.
Inventor
By William L. Symons
Attorney Patented May 25, 1926.

1,585,951

UNITED STATES PATENT OFFICE.

OTIS L. WALLER, OF DUBUQUE, IOWA.

PIPE COUPLING.

Application filed December 30, 1924. Serial No. 758,836.

My invention relates to improvements in pipe couplings or the like.

An important object of my invention is to provide a device of this character which is capable of use with an exhaust heater.

Another object of my invention is the provision, in a device of the above mentioned character, of means for accommodating a valve or the like to different sizes of pipes.

A further object of my invention is the provision of an improved packing means for a valve or pipe coupling.

A still further object of my invention is to provide a device of this character which is inexpensive to manufacture, simple of construction and installment, and strong and durable in use.

Other objects of my invention will be apparent during the course of the following description.

In the accompanying drawings, which form a part of this specification, and wherein like characters of reference denote like parts throughout the same;

Figure 1 is a side elevation of a device embodying my invention,

Figure 2 is a central longitudinal sectional view of the same,

Figure 3 is a transverse section taken on the line 3—3 of Figure 1,

Figure 4 is a perspective view of two of the ring or packing members, and

Figure 5 is a detail view of one of said ring members extended.

In the drawing, wherein for the purpose of illustration is shown a preferred embodiment of my invention, the numeral 10 designates the exhaust pipe of an automobile or the like, which has a portion cut therefrom to receive the valve casing 11. The valve casing 11 has its top portion open to register with the opening 12 in the lower portion of the elbow 13 which is rigidly secured to said valve casing preferably by means of bolts 14 and forms an auxiliary chamber adjacent said valve casing. The elbow section 13 is provided with the pocket 15 which received the transversely extending shaft 16 which extends through the elbow section and a substantial distance therebeyond on both ends. The valve member 17 is rigidly secured to the shaft 16 and is adapted to be rotated thereby. The valve 17 is substantially larger than the opening 12 and is adapted to totally close the same, when in its closed position. When the valve is opened it is adapted to rest against the flange or valve seat 18 to completely close off the gases passing through the casing 11, and thereby deflect all the gases upwardly into the elbow section 13. It will be noted that the valve seat or flange 18 is arranged at an angle with respect to the perpendicular thereby dispensing with the disadvantages incident to right angled arrangement of the valve, when open.

A flexible tubing 19 fits in the open end 20 of the elbow and is held in place by means of the set screw or bolt 21. The tubing 19 connects with any suitable type of heater 19'.

Arranged at each end of the valve casing 11 are the collars 22 which are provided with laterally extending flanges 23 which are bolted to the flanges 24 of the valve casing by means of the bolts 25. The collars are split and provided with upstanding lugs or ears 26 through which bolts 27 are passed. It will be seen that tightening the bolts 27 will contract the collars independently of the casing 11.

To accommodate the collars to various sizes of exhaust pipes I provide the ring members 28 which are adapted to be arranged within the collar members and around the exhaust pipe. These ring or packing members each comprise a strip of metal having its ends cut away at diagonally opposite corners as shown at 29 to form tongues 30. These strips are then rolled into rings and the tongues 30 will fit in the cut out portions 29. When in this position, the inside edges of the tongues snugly engage each other, but the ends of the tongues do not fit against the ends of the cutaway portions 29. The rings are placed one within the other, but with the joints arranged in staggered relation as shown in Figure 4, so that the openings between the ends of the tongues and the cutaway portions will not correspond. It will be seen that as the collars 22 are contracted by means of the bolt 27, the ring members will also be contracted about the exhaust pipe, and a gas proof joint will be formed. Any number of rings may be used.

It will be seen that the joint formed by the tongues 30 is such that no gases can escape. The limit of contraction of the rings can be regulated by the length of the cutaway portions 29. It will also be seen that the casing may be applied on exhaust pipes of various sizes.

The valve shaft 16 has one end provided with a coil spring 31, one end of which bears against the flange 24. The tendency of this spring is to keep the valve in its closed position. The end of the shaft is of hexagonal formation and is received in a corresponding hexagonal opening 32 in the end of the lever 33. This arrangement is such that the angle of the lever with respect to the shaft may be adjusted so as to properly align with the control. The set screw 34 serves to retain the lever in position on the shaft.

While the valve is shown connected to a heater, it may be used for other purposes, for instance, as an exhaust cut out valve. When used for this purpose, the elbow 13 will protect the valve seat from clogging due to dirt, mud, snow, or the like, as often occurs with the devices now in use.

While I have shown and described the preferred embodiment of my invention it is to be understood that various changes in the size, shape, and arrangement of parts may be resorted to without departing from the spirit of my invention or the scope of the subjoined claims.

Having described my invention what I claim and desire to protect by Letters Patent is:

1. A pipe connection comprising a split ring of flexible material adapted to encircle the pipe, and a split collar adapted to encircle the ring and clamp the same to form a tight connection with the pipe.

2. A pipe connection comprising a flexible ring having interfitting tongues, the edges of which are adapted to engage, said ring being contractible, and a split collar adapted to fit around said ring and clamp the same.

3. In a device of the character described, an exhaust pipe, a valve casing having lateral flanges, split collars having lateral flanges adapted to be secured to the flanges of the casing, said collars being adapted to encircle said exhaust pipe, split rings adapted to be arranged between said collars and said exhaust pipe, to form a leakproof joint, said rings being contractible and arranged one within the other with the split portions arranged in staggered relation, and means whereby the rings are clamped about said exhaust pipe by means of the collars.

4. In a device of the character described, a clamping collar adapted to be clamped to a pipe, and a split ring of flexible material arranged within said collar, said ring having cutaway portions in each of its ends forming tongues adapted to fit in the cutaway portion of the other end, the inner edge of said tongues being adapted to engage, but the ends of the tongues being normally spaced from the end of the cutaway portions, whereby the collar may be clamped about said ring and compress it about the pipe.

5. In a device of the character described a valve casing, a pipe, a clamping collar secured to said pipe, and flexible packing rings arranged between said collar and said pipe, said rings being arranged one within the other and being split with their ends cutaway to form tongues, the tongue of one end fitting in the cutaway portion of the other, the edges of said tongue being adapted to engage but the ends of said tongues being normally spaced from the ends of the cutaway portion, whereby the rings may be clamped about said pipe, said rings having their split ends arranged in staggered relation to insure a leakproof joint.

In testimony whereof I affix my signature.

OTIS L. WALLER.